Dec. 9, 1958 P. W. FOSS 2,863,170
EXTRUSION HEAD
Filed Nov. 28, 1955
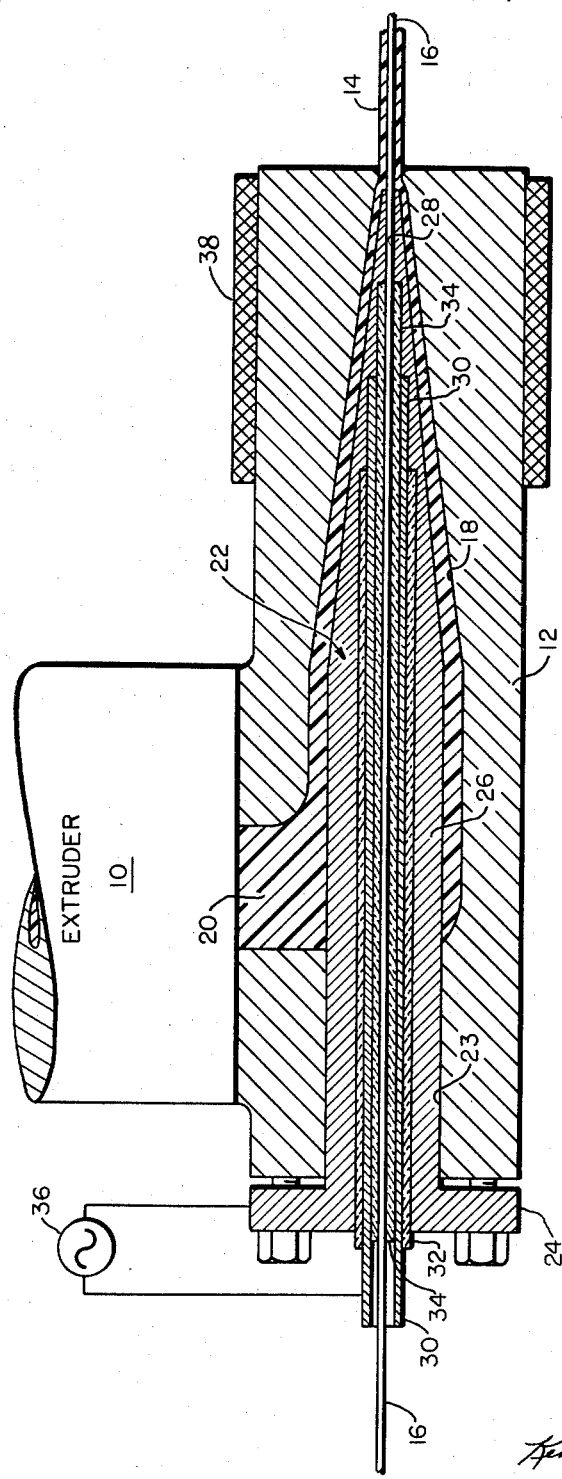
INVENTOR.
PHILIP W. FOSS
BY
Kenway, Jenney, Witter & Hildreth
ATTORNEYS

United States Patent Office 2,863,170
Patented Dec. 9, 1958

2,863,170

EXTRUSION HEAD

Philip W. Foss, Melrose, Mass., assignor to The Rex Corporation, West Acton, Mass., a corporation of Massachusetts Application November 28, 1955, Serial No. 549,232

3 Claims. (Cl. 18—13)

This invention relates to the extrusion of plastic materials and consists in improvements to apparatus for continuously extruding a plastic coating upon a wire.

A well-known method of forming an insulating coating of a plastic on a wire is to feed the wire through an extrusion head having an inwardly tapering bore. While the wire is fed, plastic material is supplied to the bore and flowed around the wire to form continuously a coating for the wire. Of the numerous devices for coating wire in this manner that have been devised, several of them employ a core within the bore having a central passage through which the wire is fed. The core serves to position the wire properly and provides an inner die surface for the flowing plastic.

With most plastics best flow conditions are attained at elevated temperatures and in many cases the range within which the temperature of the plastic must be maintained is extremely sharp. This is particularly true with polytrifluorochloro ethylene which must be maintained just below the temperature at which thermal decomposition occurs if proper plasticity is to be had. With a material such as that, the temperature of the plastic within the extrusion head must accordingly be substantially uniform throughout and within a narrow range limited at its lower end by the flow point or "no strength" temperature and at its upper end by the temperature at which thermal decomposition occurs.

To maintain such temperature conditions the extrusion head is heated by any of numerous well-known means and also the core must be heated. The present invention provides a core of simple efficient construction which lends itself to uniform and controlled heating. It further eliminates costly intricate heating elements and fluid passages and connections which have been used for similar purposes in prior art devices.

In general, this invention consists in forming the core of an electrically conductive material to which electrical connections are made directly, one at the outer end of the core and one at an inner location. The core is thus incorporated in an electrical series circuit and may be heated as desired by the current flowing through it.

Typically, the core consists of an outer body member having a central passage through which the wire to be coated is fed. An inner conductor, preferably in the form of a tube through which the wire is fed, extends into the body member and connects electrically with it at its inner end; the rest of the conductor is electrically separated or insulated from the body member and forms with it a series circuit. Conveniently, a sleeve of insulating material is provided between the body member and the conductor tube where they are separated, and a liner of insulating material is also provided within the conductor tube to keep the wire, which is fed through it, out of the circuit.

This invention is described below with reference to a preferred embodiment which has been selected for purposes of illustration and is shown in the accompanying drawing which is a longitudinal cross-section of an extrusion head embodying this invention.

The extrusion apparatus includes a feed mechanism of conventional design which terminates in an outlet 10. In this mechanism the plastic material is fed, as by screws, and the extrusion pressure is developed.

The feed mechanism itself forms no part of this invention and, its construction being well-known, is not described in detail.

Mounted on the feed mechanism at the outlet end 10 is the extrusion head 12 to which the plastic material is delivered and formed as a coating 14 about a wire 16 which is fed through the head. The head 12 is accordingly formed with an inwardly tapering open-ended bore 18 which communicates at its inner end with a passage 20 connecting with the outlet from the feed mechanism. The core 22 which extends through the bore and terminates just inside its end, is correspondingly tapered to define a conical annular passageway which merges with the wire 16 at the outlet end. The core 22 is typically in the form of a mandrel which is received in a cylindrical opening 23 leading to the bore 18 and located in the back (or upstream) end of the head 12. Outer flanges 24 formed at the back end of the core 22 permit the core to be bolted securely in place against the extrusion pressure.

The improved core construction of this invention consists in an outer core body member 26 having a conventional and well-known outer configuration, and formed of an electrically conductive material such as steel or brass. The interior of the body member is formed with a central passageway 28 through which the wire 16 is fed and into which a central conductor 30, in the form of a coaxial tube of electrically conductive material, is received with its forward or inner end in electrical contact with the body member. The rest of the central conductor 30 is electrically separated from the body member, and for this purpose is surrounded by a coaxial glass sleeve 32 which also extends into the body member 28 terminating just short of the end of the conductor 30. Within the conductor tube 30 there is also preferably provided a liner tube 34 of glass or other insulating material which serves to isolate the wire 16 from the heating circuit established through the conductor tube 30.

Heating of the core 22 is accomplished by connecting the body member 28 and the central conductor 30 into an electrical circuit including a source of energy, as indicated diagrammatically by generator 36, with the body member 28 preferably at ground potential. The current is thus caused to flow in series through the conductor 30 and body member 28 and serves admirably to heat the core by losses occasioned by its own resistance. The degree of heating can easily be regulated by changing the current through the core by well-known means.

Heating of the outside of the extrusion head is also often desired, and may be provided by a resistance winding 38 surrounding the extrusion head, or by other well-known means.

In operation, the head 12 and core 22 are heated to the desired temperature, e. g. to around 500° F., when polytrifluorochloroethylene is extruded, and the plastic is then fed from the extruder into the extrusion head 12. At the same time, a wire 16 is fed through the core, emerging just inside the end of the extrusion bore 18 where a layer of plastic formed between the bore 18 and core 22 is applied.

Although this invention has been described in detail with reference to its preferred embodiment, it is contemplated that modifications will readily occur to those skilled in the art and that such may be made without departing from the scope of this invention.

Having thus disclosed my invention and described in detail a preferred embodiment thereof, I claim and desire to secure by Letters Patent the right to exclude others from making, using and/or selling:

1. Apparatus for extruding a plastic coating upon a wire comprising an outer extrusion head having a central bore for feeding plastic around the wire and a passage for plastic communicating therewith; an inner core within said bore having a central passage for feeding a wire into said bore terminating in an axially aligned section within the discharge end of said bore, said core comprising an outer body member of electrically conductive material and an inner conductor extending substantially the length of said body member electrically connected thereto within said body member and electrically insulated therefrom over the rest of its length; and means for making electrical connection to said body member and to said inner conductor whereby an electric current may be passed through said body member.

2. Apparatus for extruding a plastic coating upon a wire comprising an outer extrusion head having a central bore and a passage for plastic communicating with the bore; an inner core extending axially within said bore having an axial passage for feeding a wire through the apparatus, said inner core comprising an outer body member of electrically conductive material, an inner tube of electrically conductive material concentric with said outer body member, and electrically connected therewith within said body member and separated therefrom over the rest of its length whereby an electrical series circuit is established between said body member and said tube; and means for supplying current to said circuit for heating said inner core.

3. Apparatus for extruding a plastic coating upon a wire comprising an outer extrusion head having an inwardly tapered central bore for feeding plastic around a wire and a passage for plastic communicating therewith; an inner core within said bore having a central passage for feeding a wire into said bore terminating in an axially aligned section within the discharge end of said bore, said core comprising an outer body member of electrically conductive material, an inner coaxial tube of conductive material within said body member electrically connected therewith within said body member, a sleeve of insulating material surrounding the tube of conductive material over its length where not in connection with said body member, and a liner of insulating material within said tube; and means for making electrical connection to said body member and to said inner tube whereby an electric current may be passed through said body member.

References Cited in the file of this patent

UNITED STATES PATENTS

| | | |
|---|---|---|
| 2,286,653 | Siegfried | June 16, 1942 |
| 2,489,508 | Stalego | Nov. 29, 1949 |
| 2,708,771 | Stoneback | May 24, 1955 |